United States Patent [19]
Reede

[11] Patent Number: 5,276,859
[45] Date of Patent: Jan. 4, 1994

[54] ACCELERATED TOKEN RING NETWORK

[75] Inventor: Ivan A. Reede, Dollard des Ormeaux, Canada

[73] Assignee: Cabletron Systems, Inc., Rochester, N.H.

[21] Appl. No.: 848,113

[22] Filed: Mar. 9, 1992

[51] Int. Cl.⁵ .................... G06F 13/00; H04L 25/52
[52] U.S. Cl. ............................. 395/550; 395/200; 364/DIG. 1; 364/241.8; 364/242.94; 364/242.95; 375/4
[58] Field of Search ................. 395/325, 550, 200; 375/4; 340/825.05; 371/11; 370/16, 85.15, 16.1

[56] References Cited

U.S. PATENT DOCUMENTS

| | | | |
|---|---|---|---|
| 4,680,753 | 7/1987 | Fulton et al. | 370/85 |
| 4,709,365 | 11/1987 | Beale et al. | 371/11 |
| 4,890,222 | 12/1989 | Kirk | 395/550 |
| 4,899,142 | 2/1990 | Nakayashiki et al. | 340/825.05 |
| 4,984,233 | 1/1991 | Nakayashiki et al. | 370/16 |
| 5,052,022 | 9/1991 | Nishita et al. | 375/4 |
| 5,084,863 | 1/1992 | Guézou et al. | 370/16.1 |
| 5,090,025 | 2/1992 | Marshall et al. | 375/4 |
| 5,101,405 | 3/1992 | Bekki et al. | 370/85.15 |
| 5,132,926 | 7/1992 | MacEachern et al. | 364/825 |

Primary Examiner—Allen R. MacDonald
Assistant Examiner—Ayaz R. Sheikh
Attorney, Agent, or Firm—Wolf, Greenfield & Sacks

[57] ABSTRACT

Methods and apparatus, including a concentrator, for operating a station coupled to a ring in a token ring network. The ring carries signal at an active monitor clock rate. The method includes the steps of generating a local clock at an accelerated clock rate that is equal to or greater than the active monitor clock rate, operating the station at the accelerated clock rate when the station is a standby monitor, operating the station at the active monitor clock rate when the station is the active monitor, operating the station at its own clock rate when the station is in loopback mode, and receiving signal from the ring and transmitting signal to the ring at the active monitor clock rate. The station operates at the accelerated clock rate of the local clock except when the station is the active monitor or is in loopback mode.

22 Claims, 15 Drawing Sheets

CONVENTIONAL FRAME / FILL SEQUENCE

ACCELERATED FRAME / FILL SEQUENCE

ACCELERATED FRAME / FILL SEQUENCE

CONVENTIONAL FRAME / FILL SEQUENCE

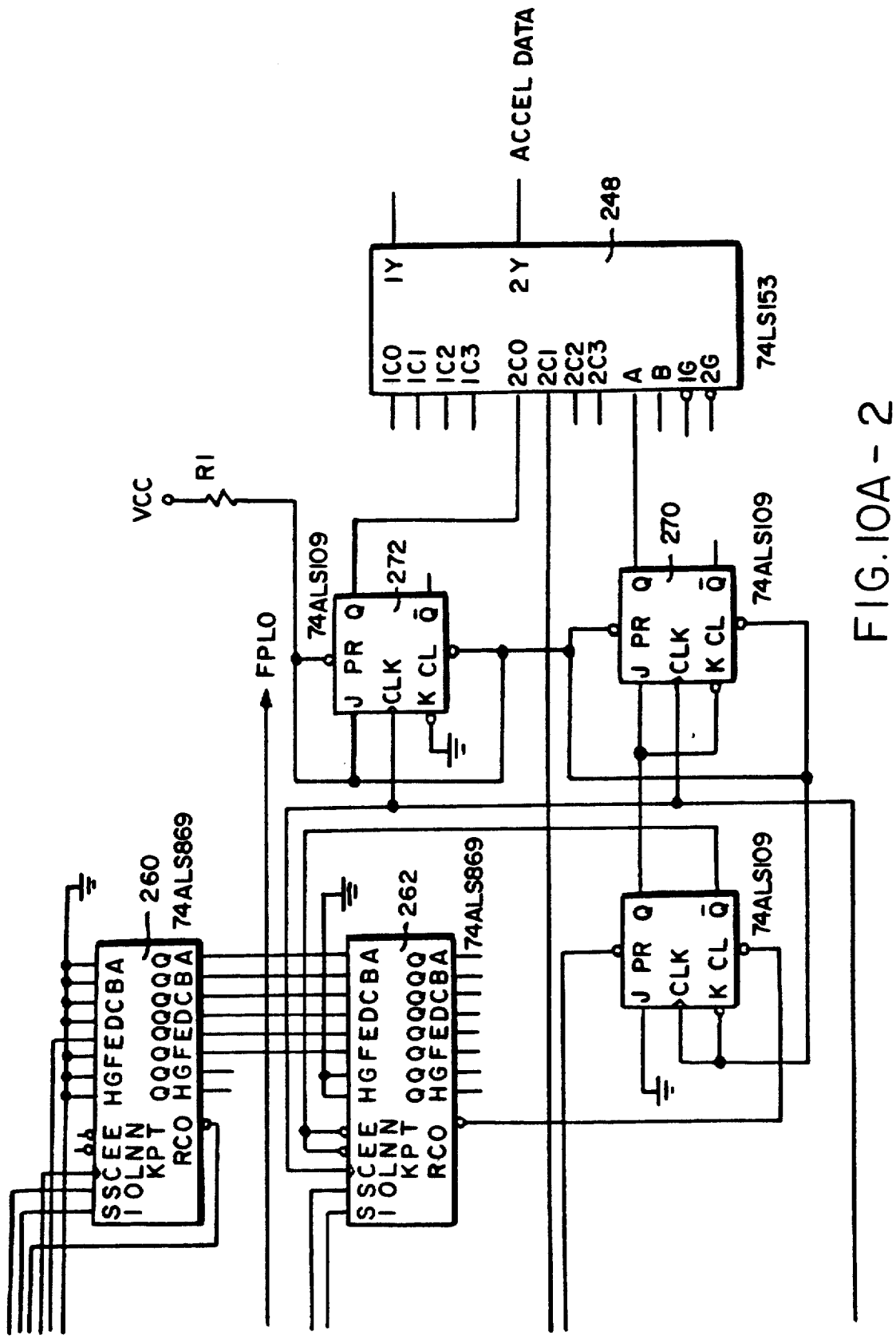
FIG.IOA-2

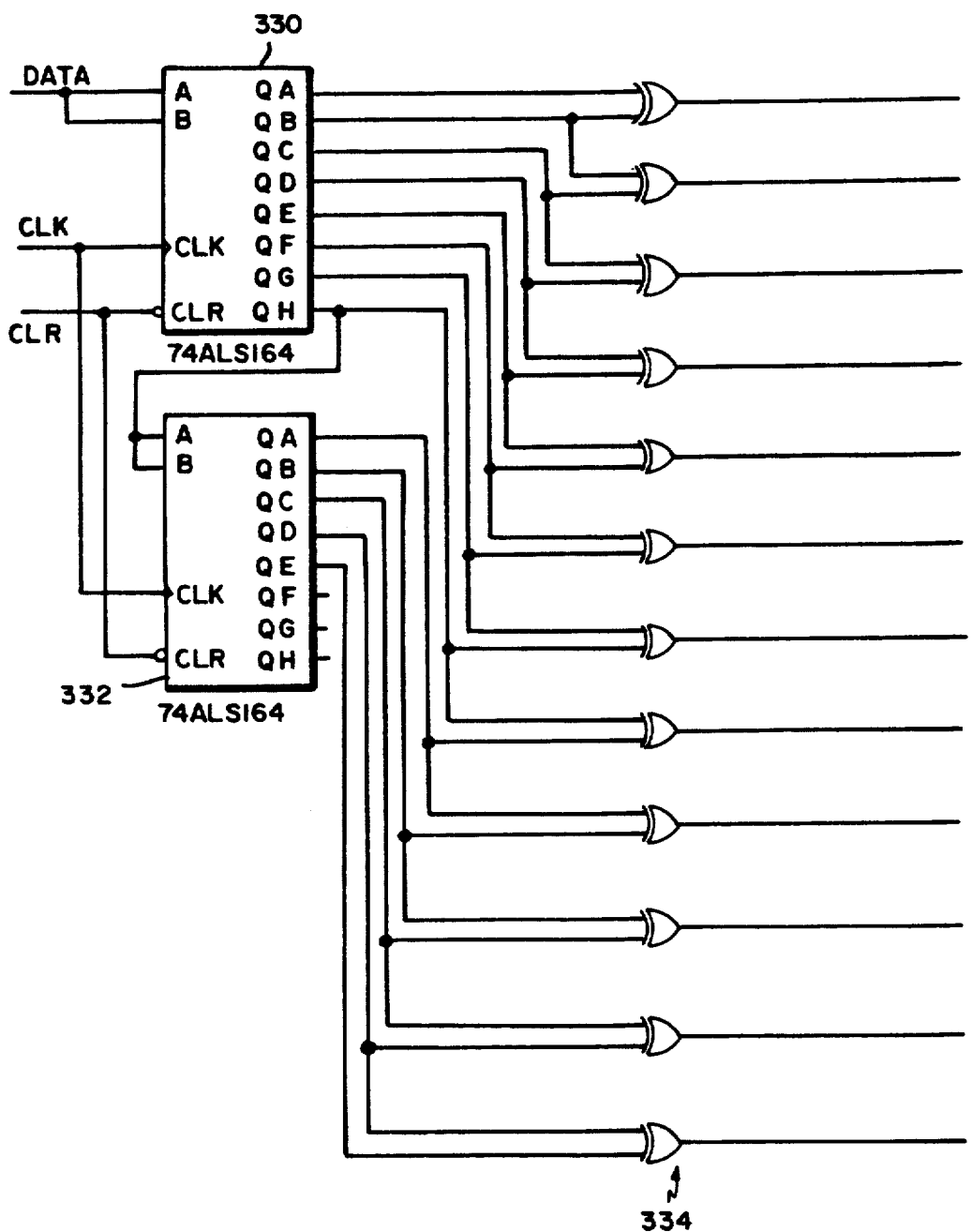
FI5-I

ACCELERATED TOKEN RING NETWORK

FIELD OF THE INVENTION

This invention relates to token ring computer networks and, more particularly, to token ring networks wherein stations are decoupled into separate clock domains for improved performance.

BACKGROUND OF THE INVENTION

A token ring computer network includes a plurality of stations connected to a data transmission path, or trunk, in the form of a closed loop. A block diagram of a conventional token ring network is shown in FIG. 1. Trunk coupling units (TCU's) 10, 12, 14, 16, 18, etc. are connected in series on a ring 20. Stations 22, 24, 26, 28, 30 receive and transmit signals through TCU's 10, 12, 14, 16, 18, respectively. A token ring network can include up to 250 stations. The ring 20 can comprise shielded twisted pair, unshielded twisted pair, optical fiber, or any other suitable media (for example, microwave).

Information is transmitted on the token ring network in frames. Token ring networks operate such that only one station at a time transmits data. The frame containing the data includes source and destination addresses. After transmission of data has been completed by one station a token circulates on the ring 20 until another station seizes the token and begins transmitting data.

The token ring network uses a synchronous data transmission technique wherein the clock and data are combined in the transmitted signal. As used herein, the term "signal" refers to the combined data and clock utilized in token ring networks. Although the clock is recovered from the signal, the data and clock remain combined except within the station. A clock transition occurs at the center of each data bit position. A transition or a lack thereof at the beginning of each bit position indicates a one or a zero in the binary data. In the insert mode, the transmitted signal is received by a TCU from its upstream neighbor and is forwarded to the station. The station receives the signal and recovers the clock and data it contains. The station then combines the two to form a new signal and retransmits the signal to its TCU. Its TCU in turn forwards the signal to its downstream neighbor. In bypass mode, as contrasted with insert mode, the TCU forwards the signal it receives from its upstream neighbor directly to its downstream neighbor. This process is repeated until the signal reaches the active monitor. When the active monitor receives the signal, it sinks the recovered clock and stores the recovered data in a FIFO buffer. The active monitor then builds a new signal with the data and its own internal clock. The new signal then goes through the same repeating process as it did before the active monitor until it reaches the station which a initially transmitted the data. Along its path, the signal data content may also have been altered if the signal passed its destination, where it will have been marked as received, or if a station detected an error in the data content of the signal, where it will have been marked as erroneous. The operation and signalling in token ring networks is governed by IEEE 802.5/1989 standard for token ring systems.

One of the stations in the token ring network is designated as an active monitor. The selection of the active monitor station is established in an arbitration process when the system is turned on, when the active monitor station ceases performing the active monitor functions, or under certain error conditions. Thus, different stations can function as the active monitor at different times. All other stations on the network function as standby monitors. The active monitor sources and sinks the clock that circulates throughout the token ring network. The standby monitor stations have the capability of generating the clock. However, when a station is in the standby monitor mode, it recovers the clock and data from the signal issued by its upstream neighbor and transmits a signal composed of the recovered clock and data to its downstream neighbor.

A block diagram of a station in a conventional token ring network is shown in FIG. 2. Incoming signal passes through an equalizer 40 to a phase locked loop 42 and a demodulator 44. The phase locked loop 42 recovers the clock from the incoming signal and controls the demodulator 44. The recovered data is input to a FIFO buffer 46 if the station is the active monitor. The recovered data and clock are supplied to a MAC layer and SMT within the station after buffering for the active monitor. The output data from the station is supplied by the MAC to a modulator 48 which combines the data and clock to form a signal which it inputs to a transmit filter 50. The modulator 48 is controlled by the recovered clock from phase locked loop 42 when the station is a standby monitor. The modulator 48 is controlled by a clock 52 (active monitor clock) when the station is the active monitor.

A number of interoperability problems have arisen in token ring networks. One of the main interoperability problems involves the operation of the phase locked loop circuits used for clock recovery. The conventional token ring network as described above consists of a chain of up to 249 phase locked loops driven by a master oscillator/clock in the active monitor station. The standard modulation technique used to encode and transmit information on the physical media combines both data and clock in a composite signal of electrical or light pulses. The station receiving the signal must recover the clock and data from the signal. Most stations use a single clock recovery circuit for both reception and transmission functions. The design of the circuit is a compromise between fast tracking ability for the received signal and low jitter content for the transmitted signal. As stations recover and retransmit the clock to downstream neighbors, distortions can occur. The distortions are dependent on implementation details and can accumulate in a very complex manner. Since the performance of each of the 250 phase locked loop circuits in a token ring network is interdependent, performance requirements on these circuits is critical. The most severe problems are clock jitter and accumulated phase slope. If these problems become sufficiently severe, system errors and system failures can occur.

In a token ring network, trunk coupling units, stations, ring media and media between the TCU and stations can be supplied by different vendors. Since the IEEE 802.5/1989 standard for token ring networks does not define how these units are implemented, the analysis of a system supplied by mixed vendors is extremely difficult. The signal received by a particular station in the network depends on all upstream stations up to the active monitor.

One prior art attempt at reducing clock coupling in the token ring network utilizes dual phase locked loops in the station. This approach breaks the overall coupling chain and apparently provides performance improvements. However, each station is still affected by its upstream neighbor and still affects its downstream neighbor. The clock coupling between stations is not broken. Furthermore, this approach can be used only in new stations and does not improve the performance of existing stations. Such stations may insert or withdraw from the ring at will and their benefits on an existing ring are thereby not assured unless practically all stations on the ring include this feature.

In general, there is a need for a token ring network architecture wherein the clock coupling between stations is broken so that deviations from normal operation do not propagate through the network. The architecture should be entirely compatible with existing stations. The principal requirement is to transmit data from station to station using frames which are relayed by every station in a synchronous clocked scheme.

It is a general object of the present invention to provide improved token ring networks.

It is another object of the present invention to provide token ring networks wherein clock coupling between stations is broken.

It is further object of the present invention to provide an improved concentrator for coupling a plurality of stations to a token ring network.

It is a further object of the present invention to provide improved methods and apparatus for coupling a ring to a station in a token ring network.

It is yet another object of the present invention to provide methods and apparatus for coupling a ring to a station in a token ring network which are compatible with existing stations.

It is a further object of the present invention to provide improved methods and apparatus for coupling to an existing token ring network.

SUMMARY OF THE INVENTION

According to the present invention, these and other objects and advantages are achieved in methods and apparatus for operating a station in a token ring network. Apparatus in accordance with the present invention includes a ring input port for received signal, a ring output port for transmitted signal and may include one or more station ports for output signal to the station and input signal from the station. The ring in the token ring network carries signals at an active monitor clock rate. The apparatus includes a local clock for generating an accelerated clock at an accelerated clock rate that is equal to or greater than the active monitor clock rate. The apparatus further includes means for operating the station at the accelerated clock rate when the station is a standby monitor, means for operating the station at the active monitor clock rate when the station is the active monitor, and means for receiving signal from the network and transmitting signal to the network at the active monitor clock rate. When inserted into the ring, the station thereby operates at the accelerated clock rate of the local clock except when the station is the active monitor or is in loopback mode. As a result, the standby monitor station is decoupled from upstream and downstream stations. The apparatus preferably includes means for operating the station at its own clock rate when the station is not inserted into the ring.

In a preferred embodiment, the means for operating the station and the means for receiving and transmitting signal comprises first accelerating means for accelerating the clock rate of the received signal from the active monitor clock rate to the accelerated clock rate to provide accelerated signal in, first decelerating means for decelerating the clock rate of the accelerated signal in to the active monitor clock rate to provide the output signal to the station port when the station is the active monitor and for maintaining the clock rate of the accelerated signal in at the accelerated clock rate to provide the output signal to the station port when the station is a standby monitor, second accelerating means for accelerating the clock rate of the input signal from the station port to the accelerated clock rate to provide accelerated signal out when the station is the active monitor and for maintaining the clock rate of the input signal from the station port at the accelerated clock rate to provide accelerated signal out when the station is a standby monitor, and second decelerating means for decelerating the clock rate of the accelerated signal out to the active monitor clock rate to provide transmitted signal to the ring output port.

The first and second accelerating means each preferably comprises means for recovering a clock and signal from an input signal to provide a recovered clock and recovered signal, means for removing fill from the recovered signal to provide frame signal, a FIFO buffer for storing the frame signal at the recovered clock rate and for outputting the frame signal at the accelerated clock rate to provide accelerated frame signal, and means for adding fill to the accelerated frame signal to provide accelerated signal. The means for recovering a clock and signal preferably comprises a digital phase locked loop. The first and second accelerating means each preferably further includes a clock differential speed estimator for estimating a difference between the accelerated clock rate and the recovered clock rate and for setting a length of the FIFO buffer in response to the difference.

The first and second decelerating means each preferably comprises means for removing fill from accelerated signal to provide accelerated frame signal, a FIFO buffer for storing the accelerated frame signal at the accelerated clock rate and for outputting the frame signal at a selected clock rate to provide selected clock rate frame signal, and means for adding fill to the selected clock rate frame signal to provide decelerated data.

According to another aspect of the invention, there is provided a concentrator for coupling a plurality of stations to a ring in a token ring network. The concentrator comprises a ring input port for received signal and a ring output port for transmitted signal, a clock for generating an accelerated clock at an accelerated clock rate that is at least slightly greater than the active monitor clock rate, an input accelerator for accelerating the clock rate of the received signal from the active monitor clock rate to the accelerated clock rate to provide accelerated signal in and an output decelerator for providing transmitted signal to the ring output port at the active monitor clock rate. The concentrator may further include a plurality of trunk coupling units coupled in series between the input accelerator and the output decelerator. Each of the trunk coupling units receives accelerated signal in from a previous trunk coupling unit or from the input accelerator and transmits accelerated signal out to a next trunk coupling unit or to the output decelerator. Each trunk coupling unit includes a station port for coupling output signal to a station and for coupling input signal from the station. Each trunk coupling unit further includes means for operating the station at the accelerated clock rate when the station is a standby monitor and means for operating the station at the active monitor clock rate when the station is the active monitor. Each trunk coupling unit preferably includes means for operating the station at its own clock rate when not inserted.

The concentrator preferably includes means for selecting the active monitor clock from the ring input port or from one of the stations connected to the station ports, and a low bandwidth clock recovery circuit responsive to the selected active monitor clock for applying a recovered active monitor clock to the output decelerator.

BRIEF DESCRIPTION OF THE DRAWINGS

For a better understanding of the present invention, together with other and further objects, advantages and capabilities thereof, reference is made to the accompanying drawings which are incorporated herein by reference and in which.

DETAILED DESCRIPTION OF THE INVENTION

Figure 1:
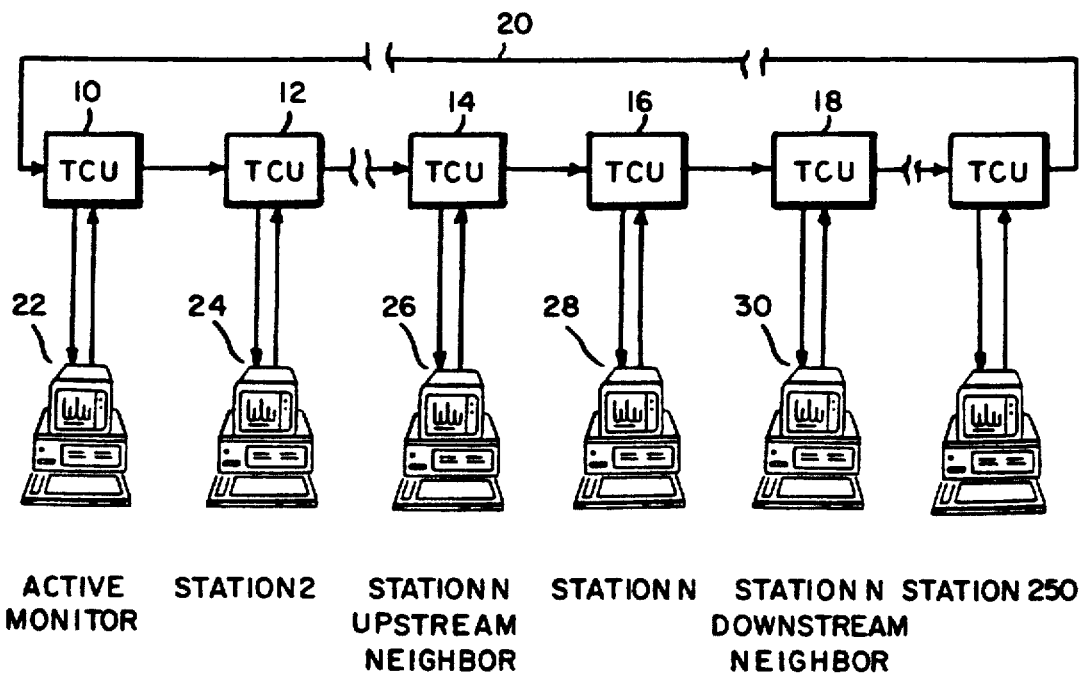
FIG. 1 is a block diagram of a conventional token ring network.
Figure 2:
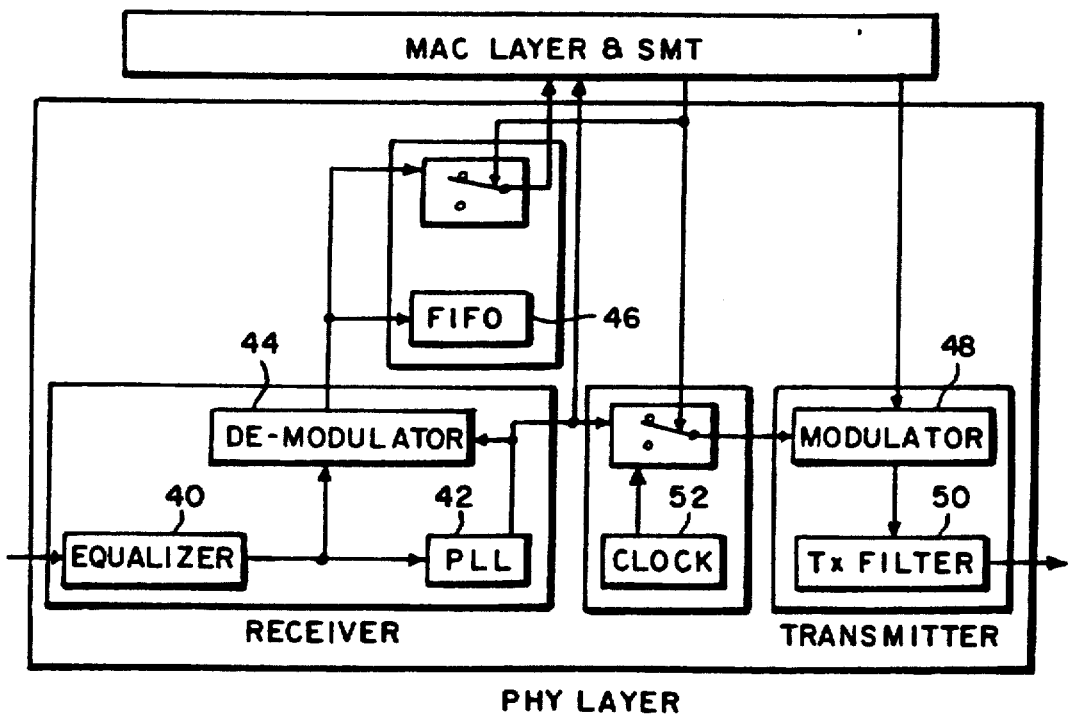
FIG. 2 is a block diagram of a station in a conventional token ring network.

The present invention provides a token ring network architecture known as an accelerated token ring in which the network is broken into multiple clock domains where each clock domain is asynchronous from neighboring clock domains. Each clock domain is self contained and is only loosely coupled to other clock domains. The clock timing and the interframe fill from an incoming signal are stripped away from the information contained in frames. Then, a new signal is formed using a new clock generated within the concentrator or the trunk control unit, and new fill is added to the information contained in the frames. The token ring network architecture of the present invention maintains reverse compatibility with conventional token ring stations by providing a clean clock within a single clock domain for each station. Each clock domain is synchronous with either the active monitor or an accelerated clock, or, in loopback mode, with the station's own clock.

In accordance with the invention, fill cycles are added or removed between frames instead of varying the clock control frequency. The technique requires that the frames be separated by a fill zone. Although the IEEE 802.5 standard for token ring networks permits fill between frames, the standard does not require that there be a mandatory fill between frames. By accelerating, or increasing, the clock rate, the time required to transmit a frame is decreased, thereby ensuring the presence of fill between frames within the accelerated domain. Fill between frames conveys no data related information. However, fill conveys control information from one station to the next. A station receiving fill knows that it has not lost contact with its upstream neighbor and uses the clock embedded in the fill to control the phase of its recovered clock.

Since the active monitor clock rate can vary, the accelerated clock rate must be high enough to guarantee that the concentrator or trunk control unit is not overflowed with information. However, the accelerated clock rate must not be so high as to require a large FIFO buffer which would introduce large unacceptable transmission latencies. In order to comply with architectural and functional specifications and to ensure reverse compatibility with existing rings, the clock rate of the signal conveyed over the trunk segments directly connected to the ring in and ring out ports of the concentrators is governed by a circuit that generates a clock whose average frequency is identical to the active monitor and is preferably implemented as a low bandwidth phase locked loop (LBPLL).

In accordance with the invention, the frames slip in absolute position relative to one another. The fill expands and contracts dynamically between frames rather than clock rates increasing and decreasing. In a preferred embodiment, to achieve this operation without modifying the stations requires that the frames be transmitted faster than they are issued. It can thus be guaranteed that there will be a minimum amount of fill between frames and that the frames can slip relative to one another. This is accomplished without requiring the reception of complete frames before transmission is initiated.

Figure 3:
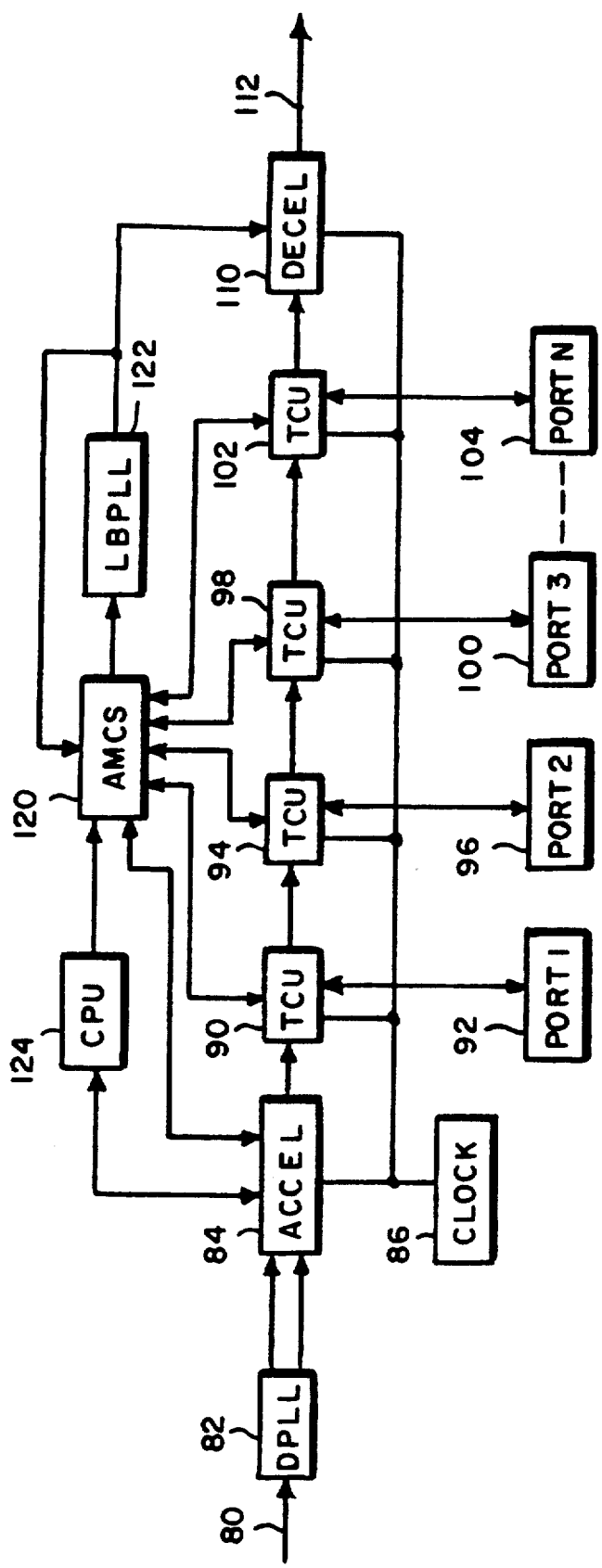
FIG. 3 is a block diagram of a concentrator in accordance with the present invention.

A block diagram of a token ring concentrator in accordance with the present invention is shown in FIG. 3. Received signal from a ring input port 80 is input to a clock and data recovery circuit 82. The ring input port 80 is an input from the token ring trunk. In a preferred embodiment, the clock and data recovery circuit 82 is a digital phase locked loop. The received signal from ring input port 80 includes an embedded clock at the active monitor clock rate. Recovered signal and a recovered clock are input from clock and data recovery circuit 82 to an input accelerator 84.

The accelerator 84 increases the clock rate of the recovered signal from the active monitor clock rate to an accelerated clock rate that is at least slightly higher than the active monitor clock rate. The accelerated clock rate is established by a local clock 86 within the concentrator. The construction and operation of accelerator 84 is described below.

The accelerator 84 outputs accelerated signal to a first trunk control unit (TCU) 90. In insert mode, the TCU 90 provides output signal to a first station port 92 and receives input signal from the station port 92. A network station is connected to station port 92. The output signal to station port 92 and the input signal from station port 92 are at the accelerated clock rate when the station is in the standby monitor mode and are at the active monitor clock rate when the station is the active monitor. In either case, the TCU 90 provides output signal to the next TCU at the accelerated clock rate. The operation of the TCU 90 is described in detail below.

The accelerated signal output from TCU 90 is provided to a second TCU 94 having station port 96. Similarly, the accelerated signal output from TCU 94 is provided to a third TCU 98 having a station port 100. An Nth TCU 102 having station port 104 receives accelerated signal from its upstream neighbor and provides accelerated signal to an output decelerator 110. The TCU's 90, 94, 98 . . . 102 are connected in series between accelerator 84 and decelerator 110 so that the information flows sequentially through these elements. A concentrator may include any number of TCU's. A concentrator can be configured with no TCU's and no station ports. In this case, the concentrator functions as a "firewall" for decoupling of upstream and downstream ring sections.

The decelerator 110 reduces the clock rate of accelerated signal received from TCU 102 from the accelerated clock rate to the active monitor clock rate and provides transmitted signal to a ring output port 112 at the active monitor clock rate. Thus, the concentrator receives signal from the token ring trunk on ring input port 80 at the active monitor clock rate and outputs transmitted signal to the token ring trunk at ring output port 112 at the active monitor clock rate. In each case, the signal includes an embedded clock at the active monitor clock rate.

The concentrator further includes an active monitor clock selector 120 that receives a clock signal from each of the TCU's 90, 94, 98 . . . 102 and from the accelerator 84. As described below, the active monitor clock selector 120 selects the active monitor clock which can be generated external to the concentrator or can be generated in one of the stations connected to station ports 92, 96, 100 . . . 104. The active monitor clock is coupled through a clock recovery circuit 122, preferably a low bandwidth phase locked loop, to the decelerator 110. A CPU 124 controls selection of the active monitor clock as described below. The clock 86 is connected to accelerator 84, TCU's 90, 94, 98 . . . 102 and decelerator 110.

The concentrator also includes a backup path (not shown) which is identical to the forward path shown in FIG. 3 except that it does not contain TCU's. The backup path has its input at the ring output port and its output at the ring input port. Furthermore, the concentrator may include TCU's in the backup path if it is configured in a "Dual Ring Architecture" as shown in IEEE Standard 802.5c-1991, FIG. 1—1, page 12, entitled "Recommended Practice For Dual Ring Operation With Wrapback Reconfiguration".

Figure 4:
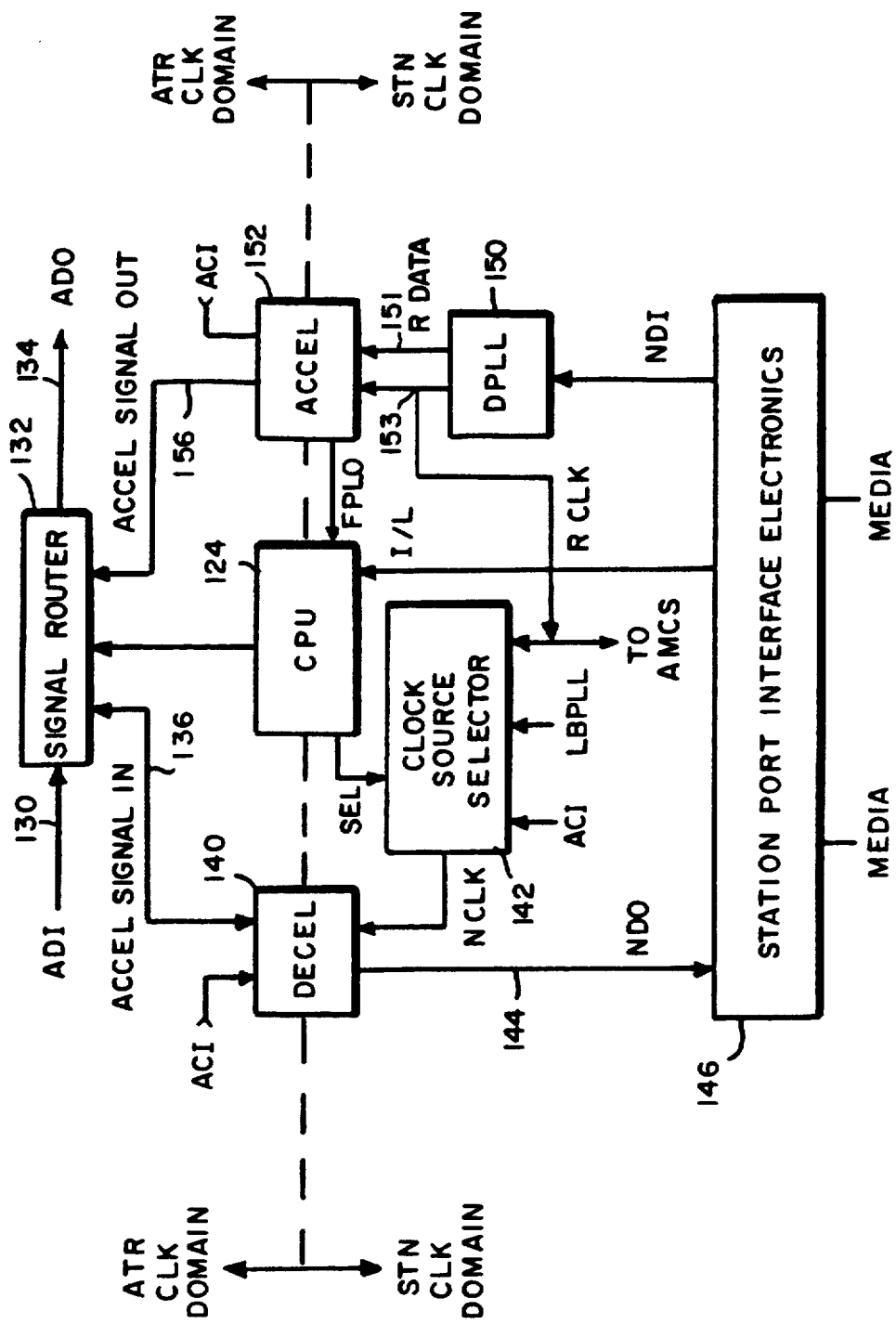
FIG. 4 is a simplified block diagram of a trunk coupling unit in the concentrator of FIG. 3.

A block diagram of a trunk control unit representative of TCU's 90, 94, 98 . . . 102 is shown in FIG. 4. Accelerated signal ADI is input on a line 130 from the accelerator 84 or from the previous TCU. The accelerated signal ADI is input to a signal router 132 which controls the insert/loopback status of the station. When the station does not request insertion in the ring, it is bypassed and the accelerated signal ADI is coupled directly to an output line 134 as accelerated signal ADO. When the station is inserted in the loop, the accelerated signal ADI on line 130 is coupled on a line 136 as accelerated signal into a decelerator 140.

The decelerator 14 receives the accelerator clock ACI from the clock 86 and a decelerator output clock N CLK from a clock source selector 142. The accelerated clock ACI controls input of accelerated signal in to the decelerator 140. The clock N CLK controls output of signal from decelerator 140 on a line 144 to a station port 146. The output from decelerator 140 on line 144 is output signal NDO to the station connected to station port 146. The clock N CLK used to transfer output signal NDO to station port 146 is at the accelerated clock rate when the station is in the standby monitor mode and is at the active monitor clock rate when the station is the active monitor. The clock N CLK is at the station's clock rate when the station is in loopback mode. As noted above, only one station in the token ring network is the active monitor. The selection of the clock N CLK is described below.

The trunk control unit shown in FIG. 4 receives input signal NDI from station port 146. As in the case of the output signal NDO, input signal NDI is at the accelerated clock rate when the station is in standby monitor mode and is at the active monitor clock rate when the station is the active monitor. The input signal NDI is at the stations' clock rate when the station is in loopback mode. The input signal NDI is input to a clock and data recovery circuit 150 such as a digital phase locked loop (DPLL). The DPLL 150 outputs recovered signal on a line 151 and a recovered clock on a line 153 to an accelerator 152. The recovered signal from DPLL 150 is input to accelerator 152 at the recovered clock rate. The recovered clock from DPLL 150 is at the accelerated clock rate except when the station connected to station port 146 is the active monitor or when the station does not request insertion into the ring. The accelerator 152 receives the accelerated clock ACI from clock 86 and outputs accelerated signal out on a line 156 to signal router 132. In the insert mode, the signal router 132 connects the accelerated signal out on line 156 to line 134.

The CPU 124 receives a signal FPLO from accelerator 152 which indicates whether or not the recovered clock on line 153 is at the accelerated clock rate. When the recovered clock is at the accelerated clock rate, the station is deemed to be a standby monitor. Otherwise, the station is the deemed to be the active monitor. The CPU provides a select signal SEL to the clock source selector 142. The clock source selector 142 provides the accelerated clock ACI, the active monitor clock (LBPLL) or the station's clock R CLK as the decelerator output clock N CLK.

The operation of the concentrator and the trunk coupling unit with respect to clock rate is summarized in Table I below. The clock rates at the inputs and outputs of accelerator 84, decelerator 140, accelerator 152 and decelerator 110 are shown for a station in the active monitor mode, for a station in the standby monitor mode and for a station in the loopback mode. In Table I, "Normal" indicates the active monitor clock rate, "Accel" indicates the accelerated clock rate and "station" indicates the station's own clock rate. The operation can be summarized as follows. The concentrator receives data from the ring input port and transmits output data to the ring output port at the active monitor clock rate in all cases. An inserted station is operated at the accelerated clock rate when it is in the standby monitor mode. An inserted station is operated at the active monitor clock rate when it is in active monitor mode. A looped back station is operated at its own independent clock rate and the signal it sends is processed by DPLL 150. The clock and signal recovered by DPLL 150 are sent via lines 153 and 151, respectively, to accelerator 152. The accelerator 152 accelerates the clock rate and the accelerated signal out is sent via line 156 to signal router 132. The signal router 132 routes the accelerated signal out received on line 156 to decelerator 140 via line 136. The decelerator 140 decelerates the accelerated signal in to the clock rate N CLK. The CPU 124 has requested the clock source selector 142 to route the recovered clock R CLK on line 153 to clock N CLK and the decelerator 140 sends the signal to station port 146 via line 144. Alternatively, line 151 can be routed to line 144 if the station does not accept the acceleration/deceleration process in the looped back mode.

TABLE I

| Station Mode | Active Monitor | Standby Monitor | Loopback |
|---|---|---|---|
| Accelerator 84 | | | |
| In | Normal | Normal | Normal |
| Out | Accel | Accel | Accel |
| Decelerator 140 | | | |
| In | Accel | Accel | Accel |
| Out | Normal | Accel | Station |
| Accelerator 152 | | | |
| In | Normal | Accel | Station |
| Out | Accel | Accel | Accel |
| Decelerator 110 | | | |
| In | Accel | Accel | Accel |
| Out | Normal | Normal | Normal |

Figure 5:
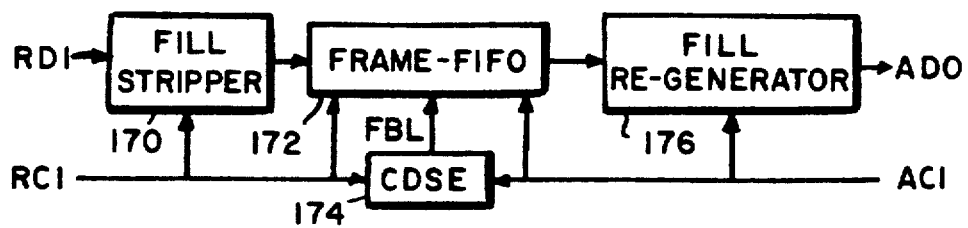
FIG. 5 is a simplified block diagram of an accelerator used in the concentrator of FIG. 3.

A block diagram of an accelerator representative of accelerator 84 and accelerator 152 is shown in FIG. 5. Recovered signal RDI is input to a fill stripper 170. The recovered clock RCI is input to the fill stripper 170, to a frame FIFO buffer 172 and to a clock differential speed estimator (CDSE) 174. The output of frame FIFO buffer 172 is input to a fill generator 176. The accelerated clock ACI is input to the frame FIFO buffer 172, the CDSE 174 and the fill generator 176. Accelerated signal ADO is output from fill generator 176.

Figure 6:
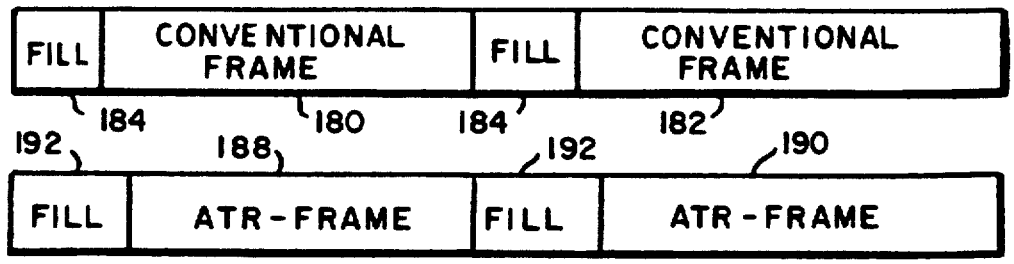
FIG. 6 is a pictorial diagram that illustrates frame acceleration by the accelerator of FIG. 5.

The operation of the accelerator is illustrated in FIG. 6. For the case where the recovered clock RCI has a rate that is lower than the accelerated clock ACI, the recovered signal RDI includes frame signals 180 and 182 and fill 184 between frames. The frame signals 180 and 182 are input to the frame FIFO 172 at the recovered clock RCI rate. The frame signals are output from frame FIFO buffer 172 at the accelerated clock rate as accelerated frame signals 188 and 190. Since the accelerated clock rate is higher than the recovered clock rate, the accelerated frame signals 188 and 190 are shorter in duration than the original frame signals 180 and 182. The fill generator 176 adds fill 192 between accelerated frames 188 and 190 to provide the accelerated signal output of the accelerator.

The clock differential speed estimator 174 compares the recovered clock RCI and the accelerated clock ACI and determines the difference in clock rates. The difference is used to control the length of the frame FIFO buffer 172. The frame buffer length FBL signal applied to the frame FIFO buffer 172 determines the minimum amount of information that must be input to the FIFO buffer 172 before the frame can be output from the FIFO buffer 172. Until the FIFO buffer contains the minimum amount of information or a completed frame has been received, the accelerator outputs fill at the accelerated clock rate. When either condition is satisfied, the accelerator stops transmitting fill and transmits the frame at the accelerated clock rate. The delay at the beginning of the frame signal while the FIFO buffer 172 is being filled is compensated for by the accelerated clock rate.

Figure 7:
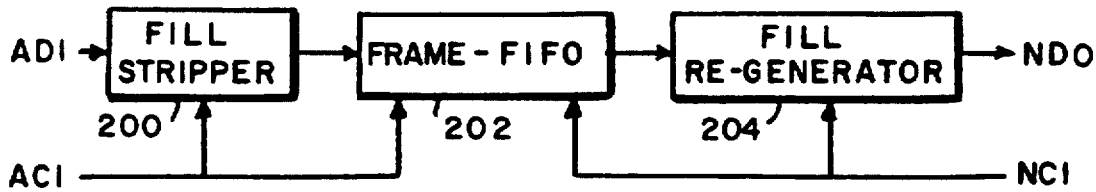
FIG. 7 is a simplified block diagram of a decelerator used in the concentrator of FIG. 3.

A block diagram of a decelerator representative of decelerator 110 and decelerator 140 is shown in FIG. 7. Accelerated signal ADI is input to a fill stripper 200. The accelerated clock ACI is input to the fill stripper 200 and to a frame FIFO buffer 202. The output of frame FIFO buffer is input to a fill generator 204. The decelerator output clock NCI is input to the frame FIFO buffer 202 and the fill generator 204. The fill generator 204 outputs decelerated signal NDO.

Figure 8:
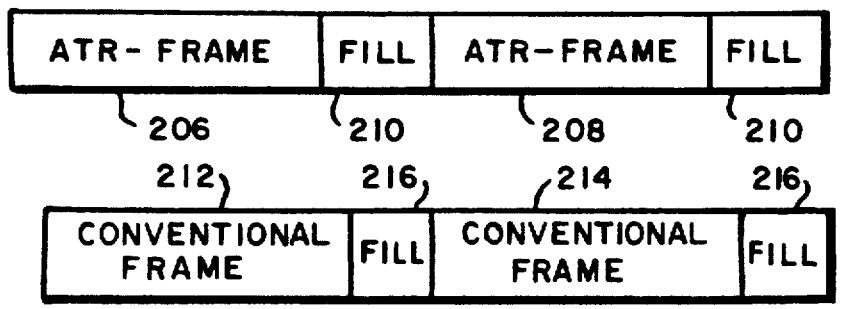
FIG. 8 is a pictorial diagram that illustrates frame deceleration by the decelerator of FIG. 7.

The operation of the decelerator of FIG. 7 is illustrated in FIG. 8 for the case where the accelerated clock ACI rate is greater than the output clock NCI rate. Accelerated frame signals 206 and 208 are separated by fill 210 as described above. The fill stripper 200 removes fill 210 and inputs frame signals 206 and 208 to frame FIFO buffer 202 at the accelerated clock rate. The frame signals contained in FIFO buffer are output as frame signals 212 and 214 at the output clock rate. The fill generator 204 adds fill 216 between frame signals 212 and 214 to provide decelerated signal NDO. When the FIFO buffer 202 is empty, the fill generator 204 transmits fill. When the FIFO buffer is not empty, the decelerator transmits the content of the FIFO buffer 202. Since the accelerated signal comes in to the decelerator faster than it comes out, the received information is stored in the FIFO buffer 202 until it can be transmitted.

The fill strippers 170 and 200 shown in FIGS. 5 and 7, respectively, wait for a starting delimiter in the frame before information is passed to the FIFO buffer. When the starting delimiter is received, the frame content is stored in the FIFO buffer. Both the accelerator and decelerator relay information on a frame by frame basis, with fill being dynamically allotted as needed. Both the accelerator and decelerator have two clock inputs. The accelerator has a recovered clock input on its input side and an accelerated clock input on its output side. The recovered clock input clocks incoming information into the FIFO buffer while the accelerated clock inputs clocks information or fill out of the accelerator. The decelerator has an accelerated clock input to input information at the accelerated clock rate and an output clock which is used to clock data out of the accelerator.

Figure 9:
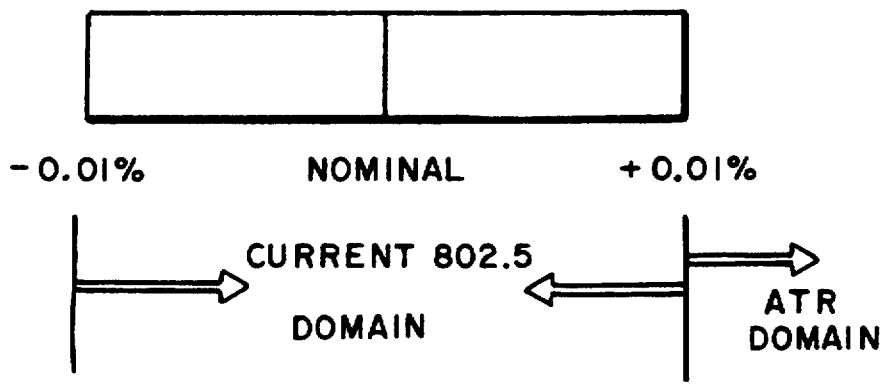
FIG. 9 is a pictorial diagram that illustrates the accelerated clock rates in accordance with the invention.

The data signaling rates in a token ring network in accordance with IEEE 802.5 are illustrated pictorially in FIG. 9. The active monitor clock rate is 4 MHz or 16 MHz + or −0.01%. The accelerated clock in accordance with the present invention must be equal to or greater than the highest possible active monitor clock rate. Thus, the accelerated clock rate is equal to or greater than 4 MHz or 16 MHz+0.01%. Preferably, the accelerated clock rate is close to the active monitor clock rate to insure proper station operation at the accelerated clock rate. A preferred accelerated clock rate is +0.03% greater than the nominal active monitor clock rate.

Figures 1, 10A:
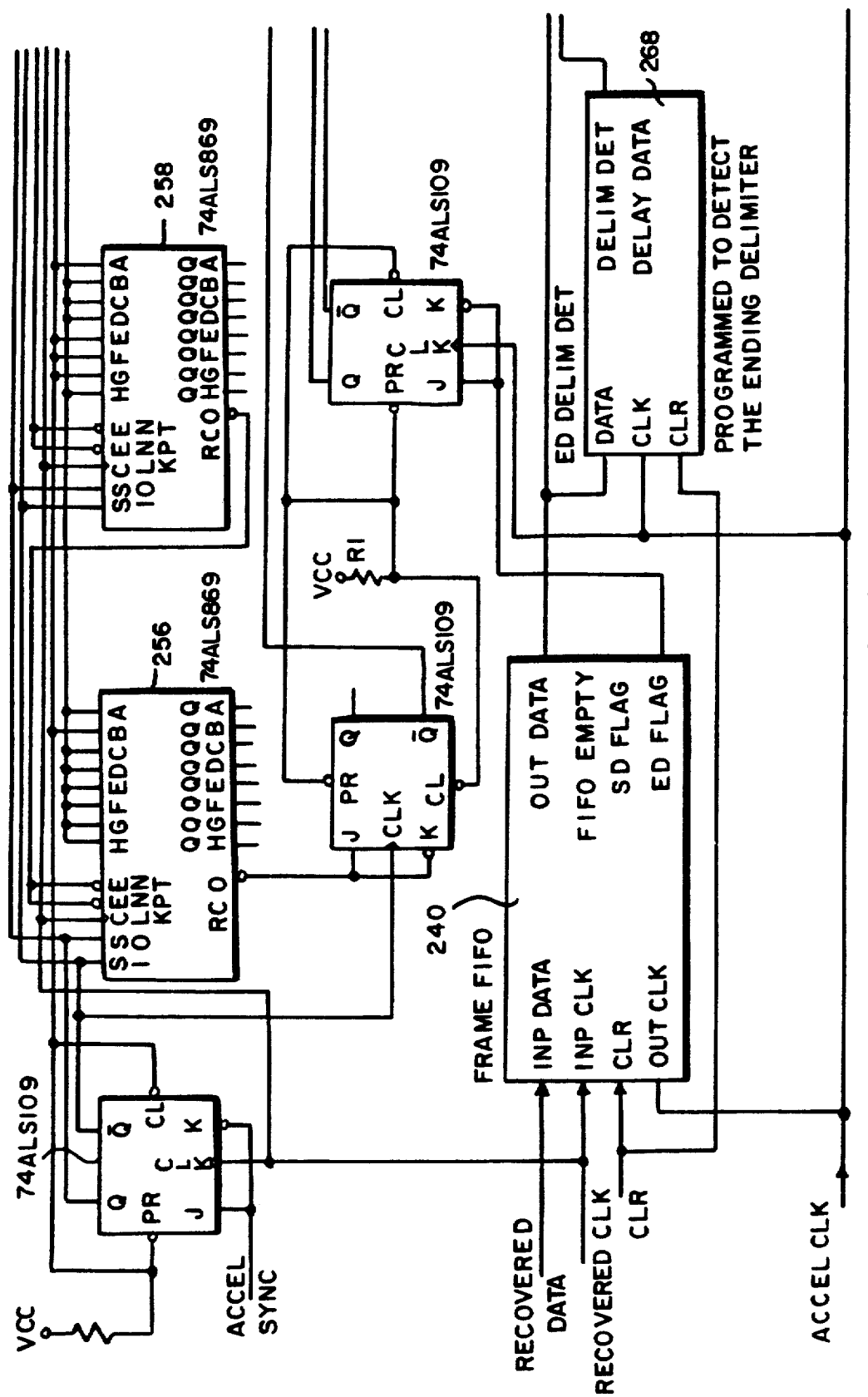
FIG. 10A is a schematic diagram of a circuit suitable for implementation of the accelerator of FIG. 5.
Figure 10B:
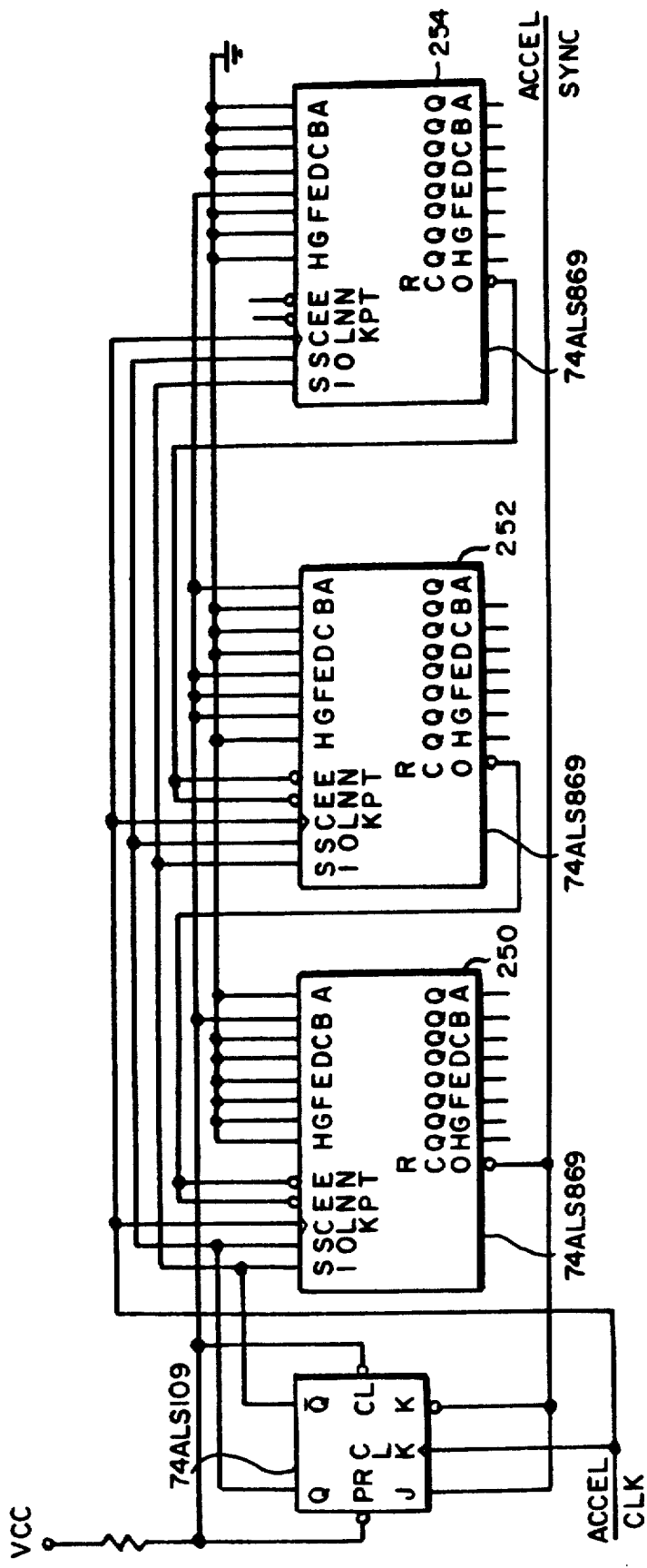
FIG. 10B is a schematic diagram of a sync generator circuit used with the accelerator of FIG. 10A.
Figure 12:
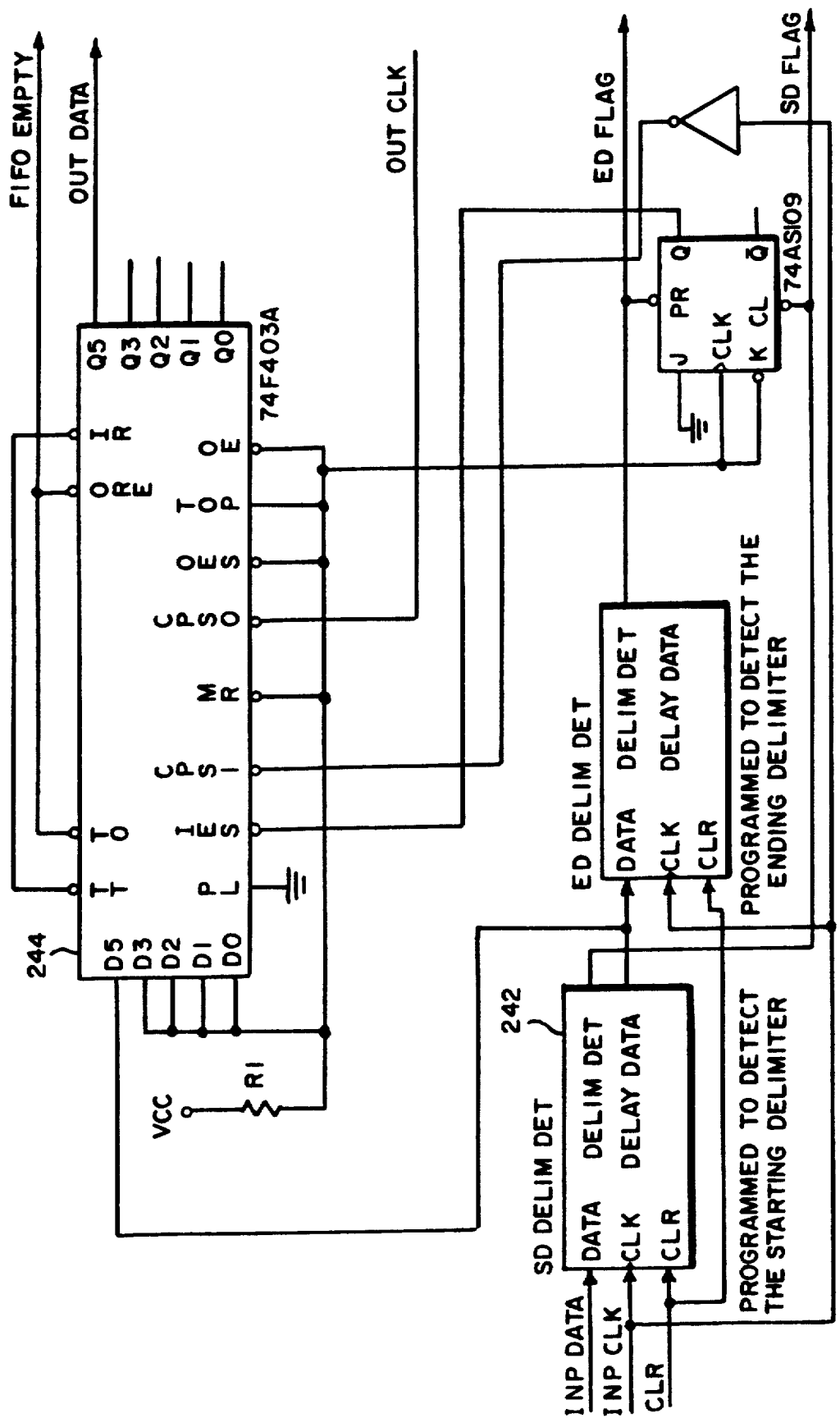
FIG. 12 is a schematic diagram of a circuit suitable for implementation of the frame FIFO used in the accelerator of FIG. 10A and the decelerator of FIG. 11.

A schematic diagram of a circuit suitable for implementing the accelerators 84 and 152 is shown in FIG. 10A. A sync generator that is functionally part of the accelerator is shown in FIG. 10B. Recovered signal and recovered clock are input to a frame FIFO 240. The details of the frame FIFO are shown in FIG. 12. A starting delimiter detector 242 detects the starting delimiter of each frame. When the starting delimiter is detected, the following signal is input to a FIFO buffer 244. Since the starting delimiter initiates transfer of signal into FIFO buffer 244, the fill preceding the frame signal is effectively removed from the recovered signal. The output of frame FIFO 240 is clocked by the accelerated clock, and the output signal from frame FIFO 240 is coupled through a data selector 248 as accelerated signal.

The clock differential speed estimator 174 shown in FIG. 5 is implemented as counters 250, 252 and 254 on the sync generator (FIG. 10B), and counters 256, 258 and 260 in FIG. 10A. The sync generator is physically separate from the accelerator circuit because a single sync generator can be common to all accelerators in the concentrator. The counters 250, 252 and 254 are loaded with a predetermined count, and the counters 256, 258 and 260 are loaded with a similar predetermined count. The counters 250, 252 and 254 are clocked by the accelerated clock, and the counters 256, 258 and 260 are clocked by the recovered clock. Both sets of counters begin counting at the same time and count toward zero. Since the accelerated clock rate is faster, it reaches zero first. At the time when counters 250, 252 and 254 reach zero, the counters 256, 258 and 260 are stopped. The number in counter 260 represents the difference in clock rates. The number representing the difference is transferred to a counter 262 which triggers output of information from frame FIFO 240.

The accelerator further includes an ending delimiter detector 268 which detects the ending delimiter of each frame. When the frame is completely transferred into frame FIFO 240, transmission of output signal is begun before the counters 250, 252, 254, 256, 258 and 260 determine the difference in clock rates. The ending delimiter detector 268 also changes the state of a flip flop 270 which controls the data selector 248. After the ending delimiter of the frame has been detected, flip-flop 270 switches data selector 248 such that fill, generated by a flip flop 272 toggled at the accelerated clock rate, is transmitted on the accelerated signal output line.

Figure 11:
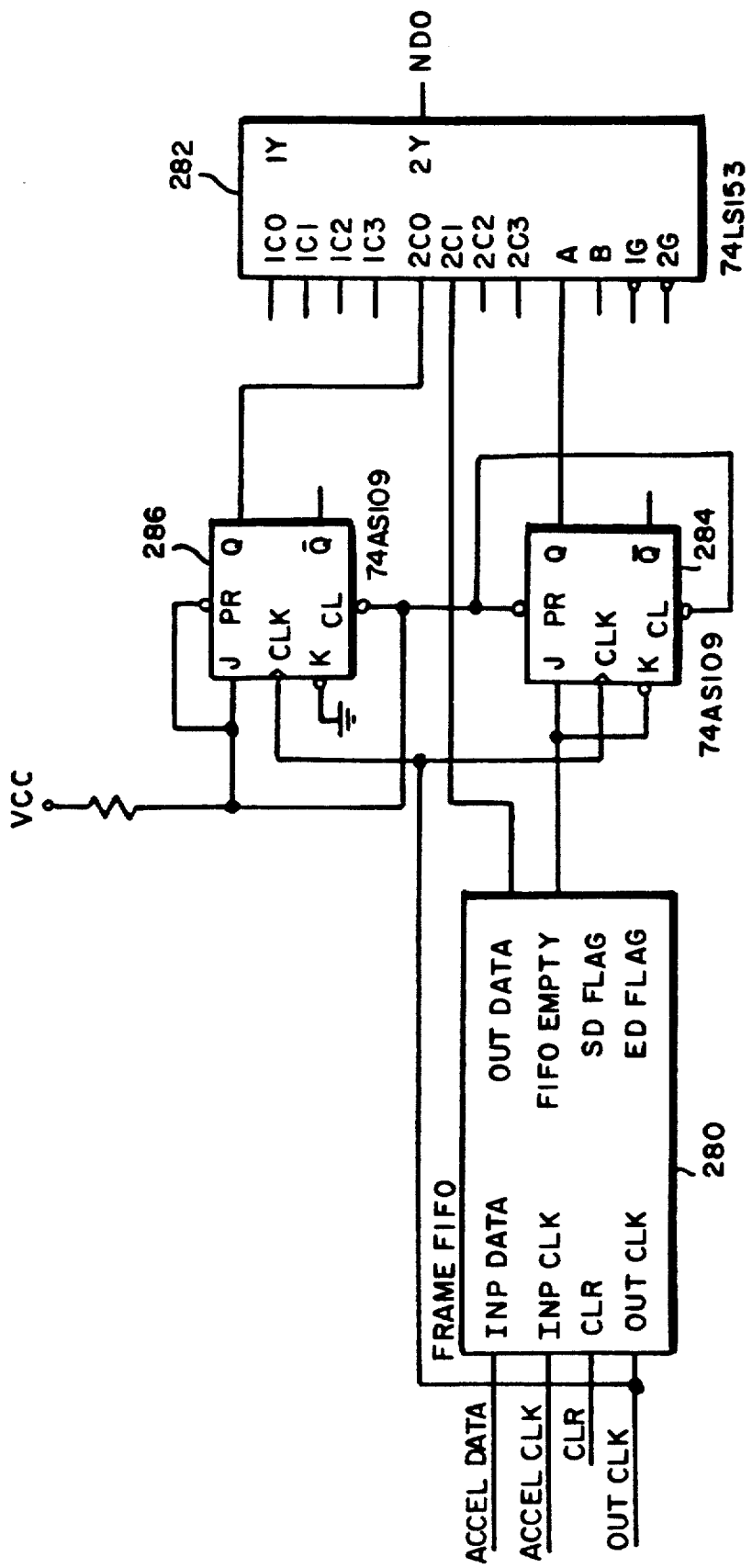
FIG. 11 is a schematic diagram of a circuit suitable for implementation of the decelerator of FIG. 7.

A schematic diagram of a circuit suitable for implementing the decelerator is shown in FIG. 11. A frame FIFO 280 receives accelerated signal and the accelerated clock at its input. A schematic diagram of the frame FIFO 280 is shown in FIG. 12. The starting delimiter detector 242 prevents input of signal to FIFO buffer 244 until detection of a starting delimiter, thereby effectively removing fill at the beginning of each frame. The output from the frame FIFO 280 is input to a data selector 282. When the frame FIFO 280 is empty, a FIFO empty signal sets a flip flop 284 which controls data selector 282. When the frame FIFO 280 is empty, the data selector 282 transmits fill, generated by a flip flop 286 toggled at the decelerator output clock rate, on the decelerator output line. Signal is transferred out from the frame FIFO 280 at the decelerator output clock rate. As described above, the decelerator output clock rate can be the active monitor clock rate, the accelerated clock rate or the station's own clock rate.

Figure 13:
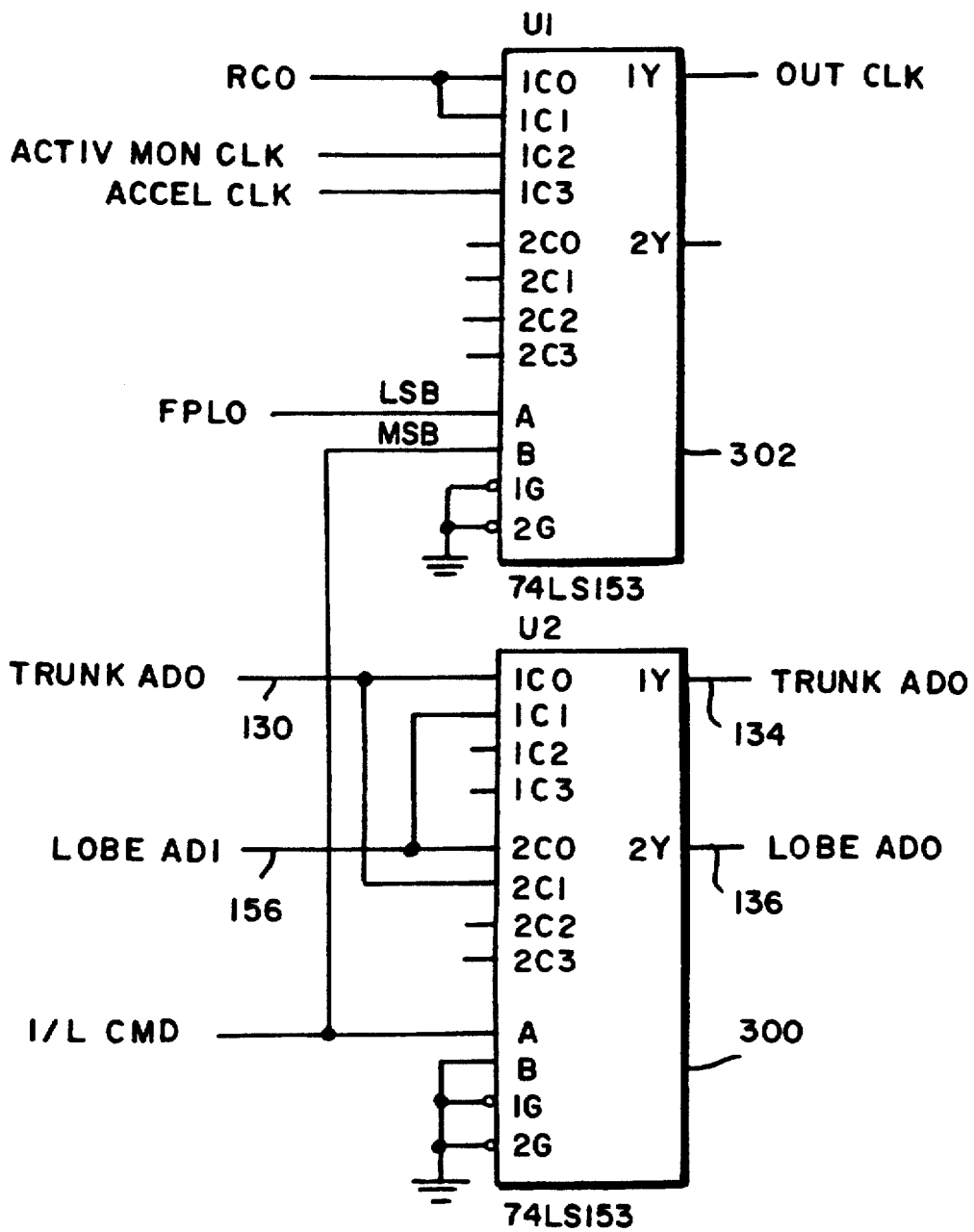
FIG. 13 is a schematic diagram of a circuit suitable for implementation of the signal router and the clock selector used in the trunk coupling unit of FIG. 4.

A schematic diagram of a circuit suitable for implementing the signal router 132 and the clock source selector 142 of FIG. 4 is shown in FIG. 13. The signal router 132 comprises a data selector 300 which controls routing of accelerated signal input and output signals in response to an I/L command from station port 146. When the I/L command indicates insert mode, the accelerated signal on line 130 is routed to accelerated signal in on line 136, and accelerated signal out on line 156 is routed to the signal output on line 134. In this mode, the signal is routed through the station. When the I/L command indicates loopback mode, the lines 130 and 134 are directly interconnected, and the station is bypassed.

The clock source selector 142 can comprise a data selector 302 which receives the active monitor clock, the accelerated clock and the recovered clock R CLK. The clock selection is controlled in response to the FPLO signal from the accelerator 152 which indicates standby monitor mode and by the I/L command. In the insert mode, when the FPLO signal indicates standby monitor mode, the accelerated clock is routed by data selector 302 to the decelerator 140 as the clock N CLK. In the insert mode, when the FPLO signal indicates active monitor mode, the active monitor clock is routed to the decelerator 140 as the clock N CLK. In the loopback mode, the recovered clock R CLK on line 153 is routed to decelerator 140 as clock N CLK.

Figures 1, 14:
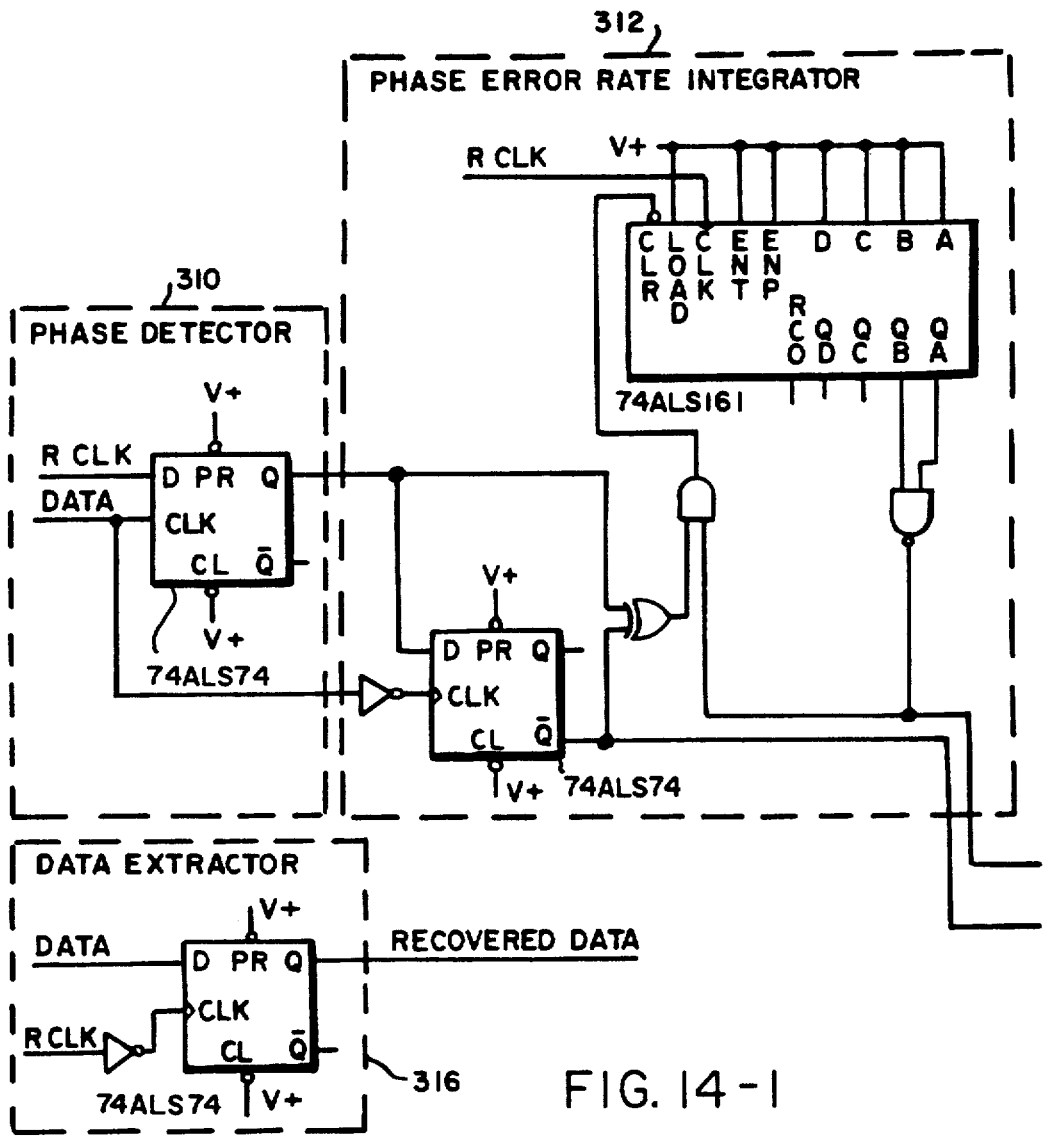
FIG. 14 is a schematic diagram of a circuit suitable for demonstration of DPLL operating principles.
Figures 2, 14:
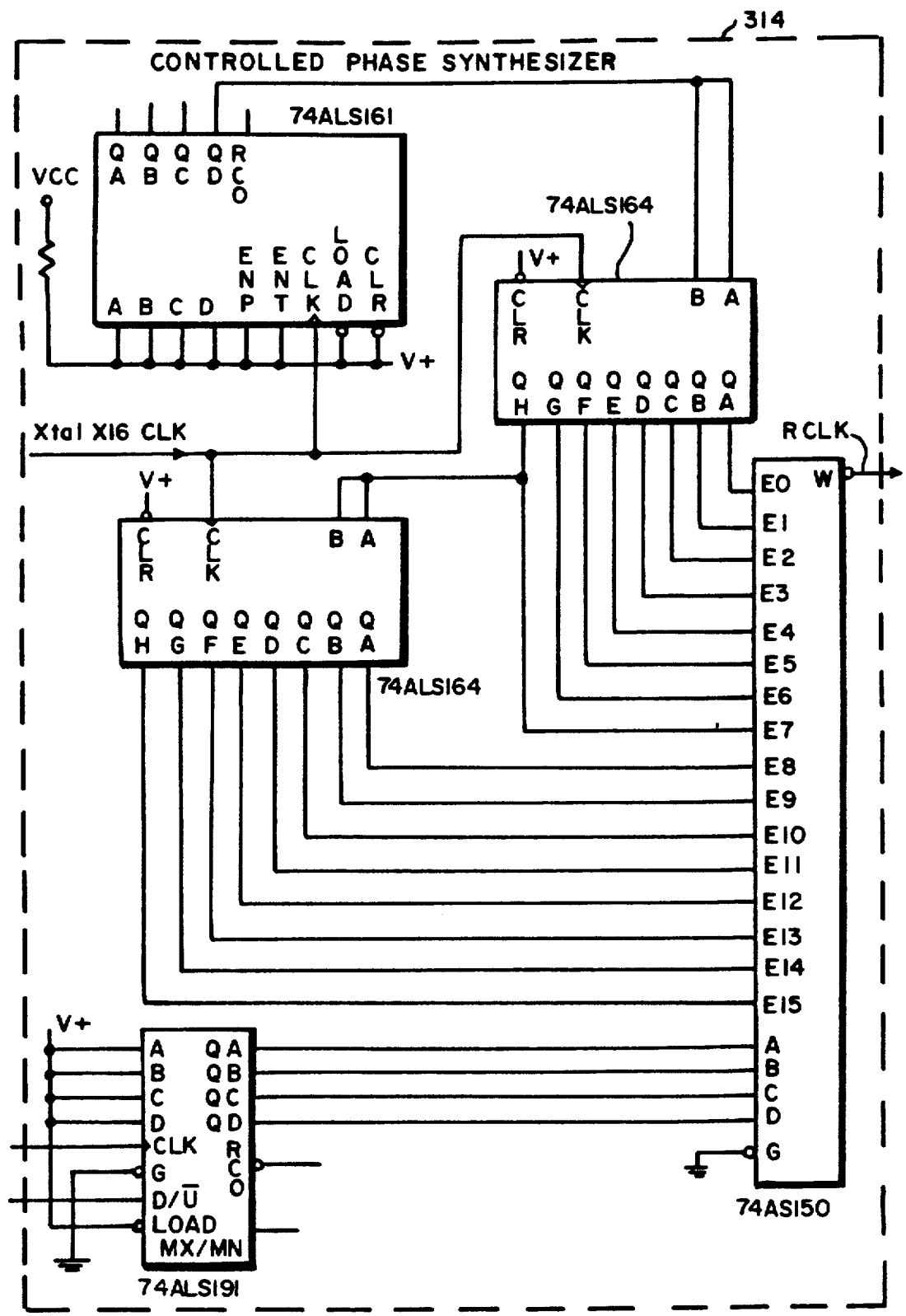

The clock and data recovery circuits 82 and 150 can be conventional analog phase locked loops or other suitable clock and data recovery circuits. In a preferred embodiment, the clock and data recovery circuits comprise digital phase locked loops. A schematic diagram of a circuit suitable for demonstrating the operating principles of a digital phase locked loop is shown in FIG. 14. The implementation of the digital phase locked loop used in the concentrator of FIG. 3 at full speed operation requires the use of higher speed circuits than those shown in FIG. 14, but which are equivalent in function to those shown. A phase detector 310 receives the synchronous data signal including data and the embedded clock. The phase detector 310 also receives the recovered clock from the phase locked loop output. A phase error signal generated by the phase detector is provided to a phase error rate integrator 312, which controls a phase synthesizer 314. The output of the digital phase locked loop is the recovered clock. A data extractor 316 separates the recovered data from the incoming data signal. Further details regarding the digital phase locked loop are provided in application Ser. No. 07/848,050, filed concurrently herewith and entitled "Digital Phase Locked Loop For Token Ring Networks", which is hereby incorporated by reference.

The primary functions of the CPU 124 shown in FIG. 3 are to control the active monitor clock selector 120 and the clock source selector 142 in each trunk control unit and to control the insert or loopback status of each station. The CPU 124 receives the I/L command from each station. The I/L command indicates whether the station is to be inserted in the token ring network. The CPU also receives the FPLO signal from each accelerator which indicates whether or not the station is the active monitor. The FPLO signal is derived from a comparison of a recovered clock rate from the station with the accelerated clock rate. When the accelerated clock rate and the recovered clock rate are approximately equal, the station is deemed to be in standby monitor mode. When the accelerated clock rate is significantly greater than the recovered clock rate, the station is deemed to be in the loopback mode or in the active monitor mode. As noted above, only one station in the token ring network is the active monitor. The active monitor can be one of the stations connected to the concentrator or can be a station external to the concentrator. The CPU provides a control signal to the active monitor clock selector 120. The active monitor clock selector is simply a data selector which routes the active monitor clock from the station within the concentrator that has been identified as the active monitor or from the ring input port to the low bandwidth phase locked loop 122. The low bandwidth phase locked loop 122 "cleans up" the active monitor clock and controls output of signal at the active monitor clock rate from decelerator 110 to the ring output port 112. The CPU 124 can also be used for interface to a network management system to provide information regarding the status of the various stations in the network.

Figures 2, 15:
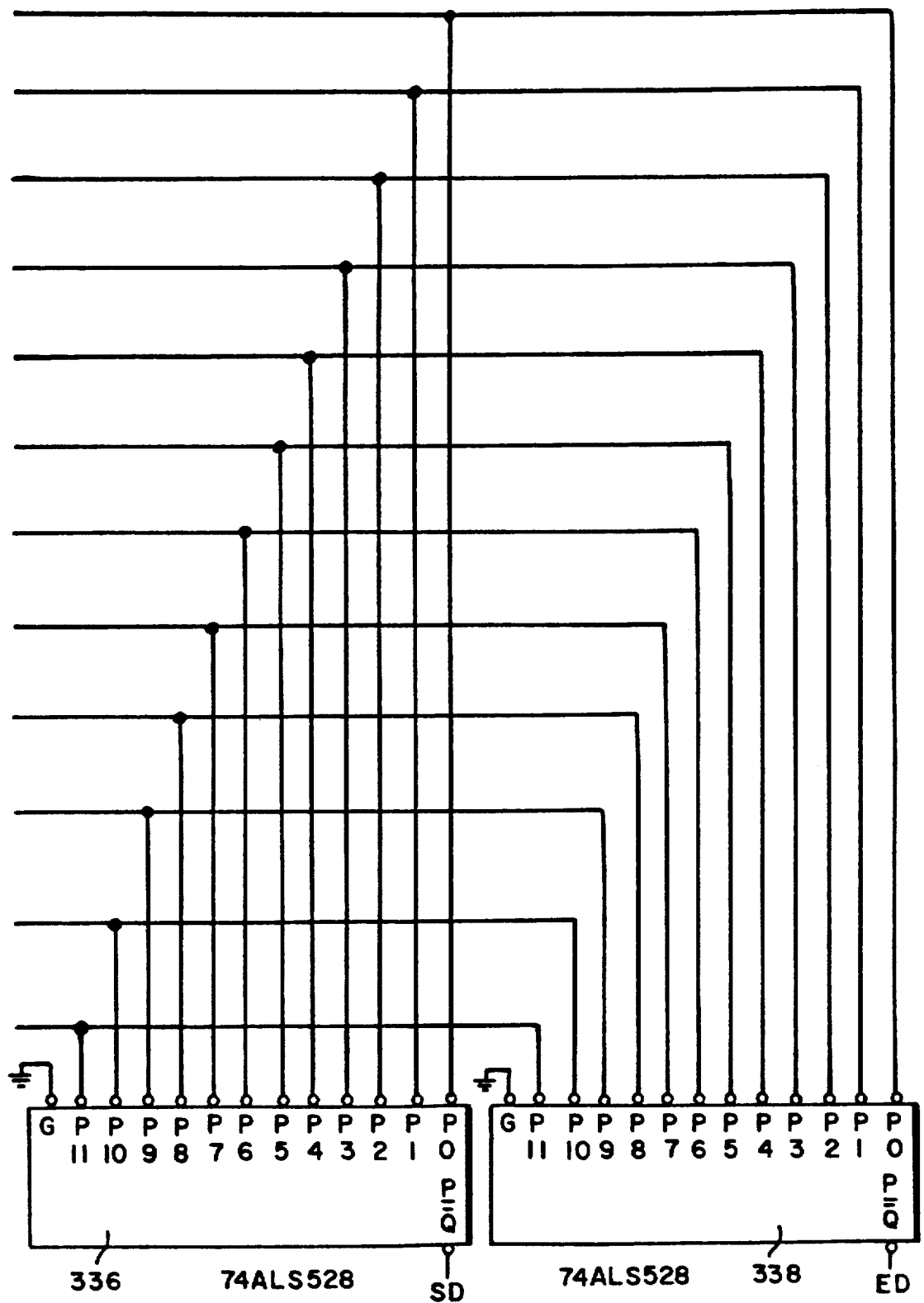
FIG. 15 is a schematic diagram of a circuit suitable for implementation of the starting delimiter/ending delimiter detector of FIGS. 10A and 12.

A schematic diagram of a circuit suitable for implementing the starting delimiter/ending delimiter detector is shown in FIG. 15. The signal is input to shift registers 330 and 332. The shift register outputs are directed through exclusive OR gates 334 to comparators 336 and 338. The comparators 336 and 338 compare the input data pattern with a preprogrammed pattern and provide an output when the input data matches the preprogrammed pattern.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A method for operating a station in a token ring network which includes a ring carrying signal at an active monitor clock rate generated by an active monitor clock, comprising the steps of:
   coupling the station to the ring through a coupling unit;
   generating a local clock in said coupling unit at an accelerated clock rate that is equal to or greater than the active monitor clock rate, said local clock being asynchronous with the active monitor clock;
   determining whether the station is a standby monitor, an active monitor or is in loopback mode;
   operating the station at the accelerated clock rate when the station is a standby monitor;
   operating the station at the active monitor clock rate when the station is the active monitor;
   operating the station at its own clock rate when the station is in loopback mode; and
   receiving signal from the ring and transmitting signal to the ring at the active monitor clock rate, the station thereby operating at the accelerated clock rate of the local clock except when the station is the active monitor or is in loopback mode.

2. Apparatus for coupling a station to a ring in a token ring network and for operating the station in the token ring network, said ring carrying signal at an active monitor clock rate generated by an active monitor clock, said apparatus comprising:
   a ring input port for received signal from the ring, a ring output port for transmitted signal to the ring and a station port for output signal to the station and input signal from the station;
   means for generating a local clock at an accelerated clock rate that is equal to or greater than the active monitor clock rate, said local clock being asynchronous with the active monitor clock;
   means for determining whether the station is a standby monitor, an active monitor or is in loopback mode;
   means for operating the station at the accelerated clock rate when the station is a standby monitor;
   means for operating the station at the active monitor clock rate when the station is the active monitor;
   means for operating the station at its own clock rate when the station is in loopback mode; and
   means for receiving signal from the ring input port and transmitting signal to the ring output port at the active monitor clock rate, the station thereby operating at the accelerated clock rate of the local clock except when the station is the active monitor or is in loopback mode.

3. Apparatus for coupling a ring to a station in a token ring network, said ring carrying signal at an active monitor clock rate generated by an active monitor clock, comprising:
   a ring input port for received signal from the ring, a ring output port for transmitted signal to the ring and a station port for output signal to the station and input signal from the station;
   a local clock for generating an accelerated clock at an accelerated clock rate that is equal to or greater than the active monitor clock rate, said local clock being asynchronous with the active monitor clock;
   first means for accelerating the clock rate of received signal from the ring input port from the active monitor clock rate to the accelerated clock rate to provide output signal to the station port at the accelerated clock rate when the station connected to the station port is a standby monitor and for providing received signal from the ring input port to the station port as output signal at the active monitor clock rate when the station connected to the station port is the active monitor; and
   second means for decelerating the clock rate of input signal from the station port from the accelerated clock rate to the active monitor clock rate to provide transmitted signal to the ring output port at the active monitor clock rate when the station connected to the station port is a standby monitor and for providing input signal from the station port to the ring output port as transmitted signal at the active monitor clock rate when the station connected to the station port is the active monitor, the station thereby operating at the accelerated data rate of the local clock except when the station is the active monitor or is in loopback mode.

4. Apparatus as defined in claim 3 wherein said first means comprises:
   a first accelerator for accelerating the clock rate of the received signal from the active monitor clock rate to the accelerated clock rate to provide accelerated signal in, and
   a first decelerator for decelerating the clock rate of said accelerated signal in to the active monitor clock rate to provide the output signal to the station port when the station is the active monitor and for maintaining the clock rate of said accelerated signal in at the accelerated clock rate to provide the output signal to the station port when the station is a standby monitor.

5. Apparatus as defined in claim 4 wherein said second means comprises:
a second accelerator for accelerating the clock rate of the input signal from the station port to the accelerated clock rate to provide accelerated signal out when the station is the active monitor and for maintaining the clock rate of the input signal from the station port at the accelerated clock rate to provide accelerated signal out when the station is a standby monitor, and
a second decelerator for decelerating the clock rate of said accelerated signal out to said active monitor clock rate to provide transmitted signal to said ring output port.

6. Apparatus as defined in claim 5 wherein said first accelerator and said second accelerator each comprises:
means for recovering a clock and signal from an input signal containing a frame signal and fill to provide a recovered clock and recovered signal,
means for removing the fill from the recovered signal to provide said frame signal,
a FIFO buffer for storing said frame signal at the recovered clock rate and for outputting said frame signal at the accelerated clock rate to provide accelerated frame signal, and
means for adding fill to the accelerated frame signal to provide accelerated signal.

7. Apparatus as defined in claim 6 wherein said means for recovering a clock and signal comprises a digital phase locked loop.

8. Apparatus as defined in claim 6 wherein said first accelerator and said second accelerator each further comprises a clock differential speed estimator for estimating a difference between said accelerated clock rate and said recovered clock rate and for setting a length of said FIFO buffer in response to said difference.

9. Apparatus as defined in claim 5 wherein said first decelerator and said second decelerator each comprises:
means for removing fill from accelerated signal containing an accelerated frame signal and fill to provide said accelerated frame signal,
a FIFO buffer for storing said accelerated frame signal at the accelerated clock rate and for outputting said frame signal at a selected clock rate to provide decelerated frame signal, and
means for adding fill to the decelerated frame signal to provide decelerated signal.

10. A concentrator for coupling a plurality of stations to a ring in a token ring network, said ring carrying signal at an active monitor clock rate generated by an active monitor clock, comprising:
a ring input port for received signal from the ring and a ring output port for transmitted signal to the ring;
a clock for generating an accelerated clock signal at an accelerated clock rate that is equal to or greater than the active monitor clock rate, said clock being asynchronous with the active monitor clock;
an input accelerator for accelerating the clock rate of the received signal from the ring input port from the active monitor clock rate to the accelerated clock rate generated by said clock to provide accelerated signal in;
an output decelerator for providing transmitted signal to the ring output port at the active monitor clock rate; and
a plurality of trunk coupling units coupled in series between said input accelerator and said output decelerator, each of said trunk coupling units receiving accelerated signal in from a previous trunk coupling unit or from said input accelerator and transmitting accelerated signal out to a next trunk coupling unit or to said output decelerator, each of said trunk coupling units including a station port for coupling output signal to a station and for coupling input signal from said station, each of said trunk coupling units further including
means for decelerating the clock rate of said accelerated signal in to said active monitor clock rate to provide the output signal to the station when the station is the active monitor and for maintaining the clock rate of said accelerated signal in at said accelerated clock rate generated by said clock to provide the output signal to the station when the station is a standby monitor, and
means for accelerating the clock rate of the input signal from the station to the accelerated clock rate to provide accelerated signal out when the station is the active monitor and for maintaining the clock rate of the input signal from the station at the accelerated clock rate generated by said clock to provide accelerated signal out when the station is a standby monitor.

11. A concentrator as defined in claim 10 wherein said input accelerator and said means for accelerating in each of said trunk coupling units each comprises
means for recovering a clock and signal from an input signal containing a frame signal and fill to provide a recovered clock and recovered signal,
means for removing the fill from the recovered signal to provide said frame signal,
a FIFO buffer for storing said frame signal at the recovered clock rate and for outputting frame signal at the accelerated clock rate to provide accelerated frame signal, and
means for adding fill to the accelerated frame signal to provide accelerated signal.

12. A concentrator as defined in claim 11 wherein said means for recovering a clock and signal comprises a digital phase locked loop.

13. A concentrator as defined in claim 11 wherein said input accelerator and said means for accelerating in each of said trunk coupling units each further comprises a clock differential speed estimator for estimating a difference between said accelerated clock rate and said recovered clock rate and for setting a length of said FIFO buffer in response to said difference.

14. A concentrator as defined in claim 10 wherein said output decelerator and said means for decelerating in each of said trunk coupling units each comprises:
means for removing fill from accelerated signal containing accelerated frame signal and fill to provide said accelerated frame signal,
a FIFO buffer for storing said accelerated frame signal at the accelerated clock rate and for outputting frame signal at a selected clock rate to provide decelerated frame signal, and
means for adding fill to the decelerated frame signal to provide decelerated signal.

15. A concentrator as defined in claim 10 further including means coupled to the input accelerator and to each of the trunk coupling units for selecting the active monitor clock from the ring input port or from one of the stations connected to said trunk coupling units, and a low bandwidth phase locked loop responsive to the selected active monitor clock for applying a recovered active monitor clock to said output decelerator.

16. A method for coupling a ring to a station in a token ring network, said ring carrying signal at an active monitor clock rate generated by said active monitor clock, comprising the steps of:
   a) coupling the station to the ring through a coupling unit and generating a local clock in the coupling unit at an accelerated clock rate that is equal to or greater than the active monitor clock rate, said local clock being asynchronous with the active monitor clock;
   b) determining whether a station connected to a station port of the coupling unit is a standby monitor, an active monitor or is in loopback mode;
   c) accelerating the clock rate of received signal from a ring input port of the coupling unit from the active monitor clock rate to the accelerated clock rate generated by said local clock to provide output signal to the station port at the accelerated clock rate when the station connected to the station port is a standby monitor;
   d) providing received signal to the station port of the coupling unit as output signal at the active monitor clock rate when the station connected to the station port is the active monitor;
   e) decelerating the clock rate of input signal from the station port of the coupling unit from the accelerated clock rate to the active monitor clock rate to provide transmitted signal to a ring output port of the coupling unit at the active monitor clock rate when the station connected to the station port is a standby monitor; and
   f) providing input signal from the station port to the ring output port of the coupling unit as transmitted signal at the active monitor clock rate when the station connected to the station port is the active monitor, the station thereby operating at the accelerated clock rate of the local clock except when the station is the active monitor or is in loopback mode.

17. The method as defined in claim 16 wherein steps c) and ) include the steps of accelerating the clock rate of the received signal from the active monitor clock rate to the accelerated clock rate to provide accelerated signal in, and decelerating the clock rate of the accelerated signal in to the active monitor clock rate to provide the output signal to the station port when the station is the active monitor and maintaining the clock rate of the accelerated signal in at the accelerated clock rate to provide the output signal to the station port when the station is a standby monitor.

18. The method as defined in claim 17 wherein steps e) and f) include the steps of accelerating the clock rate of the input signal from the station port to the accelerated clock rate to provide accelerated signal out when the station is the active monitor and maintaining the clock rate of the input signal from the station port at the accelerated clock rate to provide accelerated signal out when the station is a standby monitor, and decelerating the clock rate of the accelerated signal out to the active monitor clock rate to provide transmitted signal to the ring output port.

19. The method as defined in claim 17 wherein the steps of accelerating the clock rate include the steps of:
   recovering a clock and signal from an input signal containing a frame signal and fill to provide a recovered clock and recovered signal,
   removing the fill from the recovered signal to provide said frame signal,
   storing the frame signal in a buffer at the recovered clock rate and outputting the frame signal from the buffer at the accelerated clock rate to provide accelerated frame signal, and
   adding fill to the accelerated frame signal to provide accelerated signal.

20. The method as defined in claim 19 wherein the steps of accelerating the clock rate further include the step of estimating a difference between the accelerated clock rate and the recovered clock rate and setting a length of the buffer in response to the difference.

21. The method as defined in claim 16 wherein the steps of decelerating the clock rate include the steps of:
   removing fill from accelerated signal containing an accelerated frame signal and fill to provide said accelerated frame signal,
   storing the accelerated frame signal in a buffer at the accelerated clock rate and outputting the frame signal from the buffer at a selected clock rate to provide decelerated frame signal, and
   adding fill to the decelerated frame signal to provide decelerated signal.

22. Apparatus for coupling a ring to a station in a token ring network, said ring carrying signal at an active monitor clock rate generated by an active monitor clock, comprising:
   a ring input port for received signal from the ring, a ring output port for transmitted signal to the ring and a station port for input signal from the station and output signal to the station;
   a clock for generating an accelerated clock at an accelerated clock rate that is equal to or greater than the active monitor clock rate, said clock being asynchronous with the active monitor clock;
   means for determining whether a station connected to the station port is a standby monitor, an active monitor or is in loopback mode;
   first accelerating means for accelerating the clock rate of the received signal from the active monitor clock rate to the accelerated clock rate generated by said clock to provide accelerated signal in;
   first decelerating means for decelerating the clock rate of said accelerated signal in to said active monitor clock rate to provide the output signal to the station when the station is the active monitor and for maintaining the clock rate of said accelerated signal in at said accelerated clock rate generated by said clock to provide the output signal to the station when the station is a standby monitor;
   second accelerating means for accelerating the clock rate of the input signal from the station to the accelerated clock rate generated by said clock to provide accelerated signal out when the station is the active monitor and for maintaining the clock rate of the input signal from the station at said accelerated clock rate to provide accelerated signal out when the station is a standby monitor; and
   second decelerating means for decelerating the clock rate of said accelerated signal out to said active monitor clock rate to provide transmitted signal to said ring output port, the station thereby operating at said accelerated clock rate established by said clock except when the station is the active monitor or is in loopback mode.

* * * * *

UNITED STATES PATENT AND TRADEMARK OFFICE
CERTIFICATE OF CORRECTION

PATENT NO. : 5,276,859
DATED : January 4, 1994
INVENTOR(S) : Reede

It is certified that error appears in the above—identified patent and that said Letters Patent is hereby corrected as shown below:

At col. 5, line 39, delete "10A is a schematic diagram" and substitute -- 10A-1 and 10A-2 are schematic diagrams --; at col. 5, line 41, delete "10A" and substitute -- 10A-1 and 10A-2; at col. 5, line 51, delete "14" and substitute -- 14-1 and 14-2 --.
At col. 5, line 53, delete "15 is a schematic diagram" and substitute -- 15-1 and 15-2 are schematic diagrams --; at col. 5, line 55, delete "10A" and substitute -- 10A-1 --.
At col. 11, line 5, delete "10A" and substitute -- 10A-1 and 10A-2 --; at col. 11, line 22, delete "10A" and substitute -- 10A-1 and 10A-2 --.
At col. 12, line 38, delete "14" and substitute -- 14-1 and 14-2 --.
At col. 12, line 41, delete "14" and substitute -- 14-1 and 14-2 --.
At col. 13, line 24, delete "15" and substitute -- 15-1 and 15-2.

At col. 17, line 45, delete " ) " (second occurrence) insert -- d) --.

Signed and Sealed this

Twentieth Day of September, 1994

Attest:

BRUCE LEHMAN

Attesting Officer

Commissioner of Patents and Trademarks